United States Patent [19]

Tsuchiya et al.

[11] Patent Number: 4,630,534
[45] Date of Patent: Dec. 23, 1986

[54] APPARATUS FOR INACTIVATION OF ENZYMES IN OIL SEEDS

[75] Inventors: Kanji Tsuchiya, Tokyo; Shizumi Ono, Chiba, both of Japan

[73] Assignee: Seikensha Co., Ltd., Tokyo, Japan

[21] Appl. No.: 708,850

[22] Filed: Mar. 6, 1985

[51] Int. Cl.⁴ .................................................. A23C 3/02
[52] U.S. Cl. ........................................... 99/483; 99/516
[58] Field of Search ................. 99/518, 516, 519, 483; 435/287, 302, 306, 311, 313, 315, 316; 241/260.1, 247; 198/661, 662, 676

[56] References Cited

U.S. PATENT DOCUMENTS

| | | | |
|---|---|---|---|
| 1,886,592 | 11/1932 | Royle | 198/661 |
| 2,404,884 | 7/1946 | Pieper | 198/661 |
| 2,569,039 | 9/1951 | Berthelot | 198/661 |
| 3,508,683 | 4/1970 | Schee | 198/661 |
| 4,128,051 | 12/1978 | Hildebolt | 99/516 |

FOREIGN PATENT DOCUMENTS

| | | | |
|---|---|---|---|
| 2540746 | 8/1984 | France | 241/260.1 |
| 4470156 | 10/1981 | Japan . | |
| 657845 | 4/1979 | U.S.S.R. | 241/260.1 |

*Primary Examiner*—Samuel Scott
*Assistant Examiner*—Noah Kamen
*Attorney, Agent, or Firm*—Browdy and Neimark

[57] ABSTRACT

A device for inactivating enzymes in soybeans comprises a generally air tight pressure cylinder having an axial screw which moves the soybeans from an upstream end to a downstream end where the inactivated soybeans are discharged. The screw has three zones, an upstream feed zone, a central agitation zone which runs about ½ the length of the pressure cylinder, and a downstream feed zone. A steam jacket is placed over the pressure cylinder especially in the area starting with the beginning of the agitation zone, and also an infeed pipe for the feeding therein of a buffer solution.

6 Claims, 2 Drawing Figures

APPARATUS FOR INACTIVATION OF ENZYMES IN OIL SEEDS

FIELD OF INVENTION

This invention relates to an apparatus for thermally inactivating the enzymes, such as lipoxygenase, in oil seeds, which apparatus is commonly installed in the assembly of machinery for the continuous production of liquid foods from oil seeds.

BACKGROUND OF THE INVENTION

Of known liquid foods obtained from oil seeds, soybean milk is the most common, the soybean being considered a kind of oil seed. There have been provided various proposals for the production of soybean milk from soybeans. However, soybean milk as produced by known methods is likely to become easily deteriorated in quality due to changes of surrounding conditions during storage, and such deterioration is accompanied by a disagreeable soybean odor, a roughness, a disagreeable bitterness, astringency, etc.

In addition, as soybean proteins are sensitive to heat and chemicals, the conventional techniques are often unable to cope with unexpected difficulties which often occur in the production of an acceptable and stable soybean milk.

Many proposals have been made to solve these problems so that improved soybean milk can be made which is consistently stable against changes in the surrounding conditions and without deterioration of quality even after longer than normal storage, but none of these proposals has been particularly successful.

It has previously been proposed by one of the present inventors to provide a method for the production of liquid food from oil seeds which method includes inactivating the enzymes in said oil seeds, noting Japanese examined patent publication No. 56-44701, but it has been found that the liquid foods obtained according to such method are not sufficiently stable when changes in surrounding conditions occur, and the liquid foods obtained easily deteriorate in quality under such conditions.

SUMMARY OF THE INVENTION

Studies have now been conducted in order to solve the aforementioned problems and in order to produce liquid foods from oil seeds which are consistently stable even when surrounding conditions are adverse, and which liquid foods do not deteriorate in quality even when subjected to long storage. As a result, it has now been found that the method of said examined Japanese patent publication is not satisfactory because such method is not carried out in the method in such a way as to sufficiently inactivate the oil seed enzymes which cause such problems.

It is therefore an object of the present invention to provide an improvement in the known process for the production of liquid foods from oil seeds.

A further object is to provide an apparatus for the inactivation of enzymes, such as lipoxygenase in oil seeds, which enzymes are factors which generate disagreeable odors, bitterness, astringency, roughness, etc. in liquid foods of oil seeds such as soybean, which apparatus may be installed in a controllable assembly of associated machinery used in the production of acceptable liquid foods such as oil seed milk from oil seeds.

Another object of the invention is to provide an apparatus for producing liquid foods from oil seeds, which apparatus comprises (1) a means for skinning the oil seeds, (2) a means for removing the outer skins and refuse from the oil seeds, (3) said apparatus of inactivating the enzymes contained in the skinned oil seeds, (4) a means of grinding the enzyme-inactivated oil seeds to obtain an emulsion, (5) a means of making the particles of the emulsion of finer size (6) a means of removing unnecessary materials such as card refuse, i.e. undesired coagulated or caked fibrous materials, (7) a means of deaerating and adjusting the product resulting from the preceding step while adding seasonings, (8) a means of sterilizing and deodorizing the seasoned emulsion, (9) a means of homogenizing the emulsion under high pressure conditions, (10) a means of cooling the homogenized emulsion, and (11) a means of packaging the cooled emulsion in an appropriate container under aseptic conditions.

DESCRIPTION OF EMBODIMENTS

Apparatus according to the invention for inactivation of the enzymes in oil seeds is constituted principally by a pressure cylinder on which is mounted an infeed hopper at the upstream end, and an exhaust pipe at the downstream end, the pressure cylinder being encircled by a jacket provided with a hot vapor supply pipe. The pressure cylinder is also provided with a buffer solution supply pipe and has therewithin a rotary screw which rotates about a rotary axis and which has a plurality of different screw sections. The first or most extreme section contains a conveying propeller screw; downstream in the middle portion is an agitation fan screw; and at the downstream end is a second conveying propeller screw.

The present apparatus may be employed solely for the purpose of inactivating the enzymes of oil seeds, especially lipoxygenase of soybeans, independently of other treatments required to produce liquid foods from oil seeds, particularly soybean milk from soybeans. However, the most preferred way of using the apparatus of this invention is in combination as part of a controllable assembly of continuously linked devices for the production of said liquid foods, particularly soybean milk.

Figure 1:
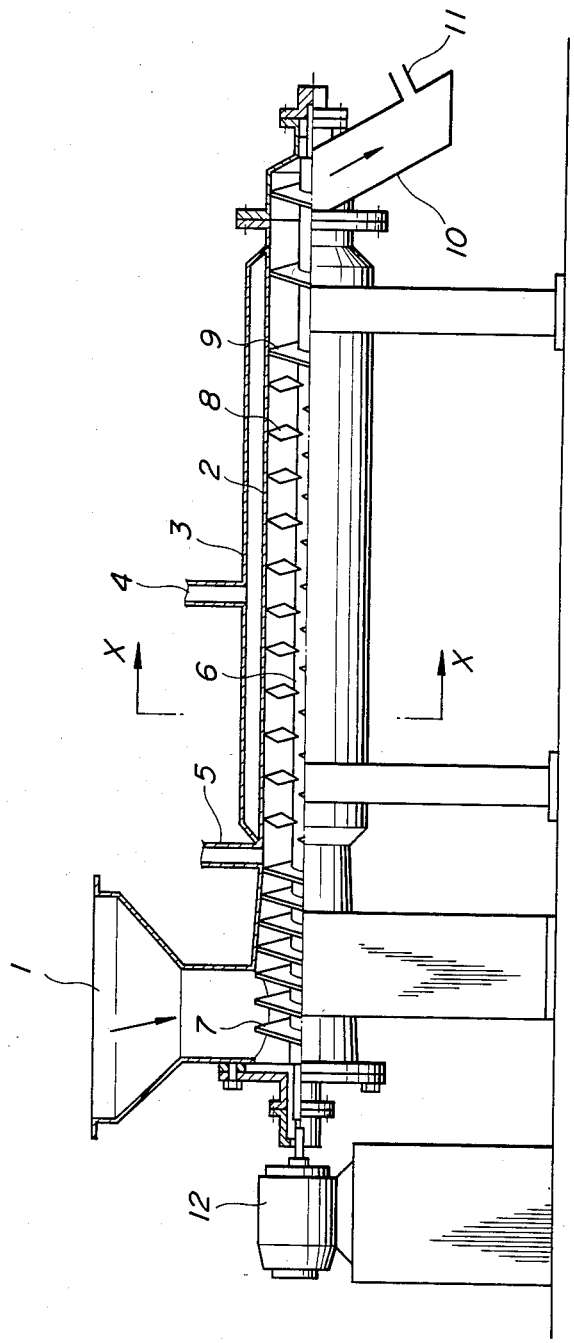
FIG. 1 is an elevational view, partly in section, of an apparatus in accordance with the invention.
Figure 2:
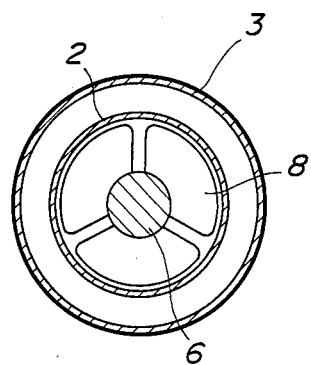
FIG. 2 is an sectional view taken along line X-X of FIG. 1.

With reference to FIG. 1 which shows a preferred embodiment of an apparatus for the inactivation of enzymes in oil seeds to produce liquid foods from oil seeds, particularly daily acceptable soybean milk from soybean according to the present invention, there is shown a hopper 1 to receive whole or skinned or ground raw materials, e.g. soybeans. The hopper in turn empties into the upstream or front end portion of a pressure cylinder 2 having an exhaust pipe 10 at its downstream end or back end portion for the discharge of enzymes-inactivated raw material.

The exhaust pipe 10 is provided with a hot water supply pipe 11 through which hot water is introduced from a service tank (not shown) and is preferably directly connected without an air gap to a downstream grinder of the closed type (not shown), the closed connection being to prevent the creation of an air jet in the grinder.

Surrounding most of the pressure cylinder is a pressure cylinder jacket 3 for providing heated fluid to the exterior of the pressure cylinder to thereby effect the heating thereof, the pressure cylinder 2 being closely mantled by the jacket 3 as illustrated. A suitable fluid supply pipe 4 is directly connected to the pressure cylinder jacket 3 for the infeed of heated vapor.

Immediately upstream of the pressure cylinder jacket 3 is provided a buffer solution supply pipe 5 which empties into the pressure cylinder 2. The buffer solution supply pipe 5 is provided with a switch valve (not shown) mounted to the front wall portion of the pressure cylinder 2, but which does not open into the pressure cylinder jacket 3. The buffer solution supply pipe 5 is disposed vertically as illustrated in FIG. 1, and is located at an axial position corresponding to ¼ the length of the rotary axis 6 measured from its front or input end.

Within the pressure cylinder 2 is provided a rotary axis horizontally supported by a bearing at one end and another bearing at the other end, and connected to a drive motor 12 which effects the rotation of the rotary axis 6. Mounted on the rotary axis 6 at the upstream portion adjacent the hopper 1 is a conveying screw 7, and downstream therefrom, within that portion of the pressure cylinder 2 surrounded by the pressure cylinder jacket 3, is an agitation fan-like screw (hereinafter "fan screw") 8. Lastly, at the downstream end of the rotary axis 6 near the exhaust pipe 10 is a second conveying screw 9.

The conveying screw 7 on the rotary axis 6 is located at the upstream part of the rotary axis to a position near, but not beyond, a downwardly extended tangent line of the outer wall of the buffer solution supply pipe 5. The outer circumference of the conveying screw 7 slidably touches the internal wall face of the pressure cylinder 2 such that the space formed by the internal wall face of the pressure cylinder 2 and the peripheral edge of the blade of the conveying screw 7 form together an air tight seal.

The conveying screw 9 is provided in the last ¼ length of the rotary axis 6 measured from the downstream end. As in the case of the conveying screw 7, similarly the conveying screw 9 slidably touches the internal wall face of the pressure cylinder 2 with the outer edge of its screw blade so that a generally air tight seal is formed between the two.

The center section of the rotary axis 6, constituting about ½ of the length thereof, is provided with the agitation screw 8 which desirably takes the form of a fan screw as shown in FIG. 1.

The scale of the pitch of each of the screw sections on the rotary axis, namely the conveying screw 7, the agitation fan screw 8 and the conveying screw 9, is such that the most upstream screw 7 has the smallest pitch and the most downstream screw 9 has the largest pitch, with the fan screw 8 in the middle having a pitch therebetween; the ratio of these pitches is desirably 1:2:3. The total length of the rotary axis is preferably not less than two meters.

The internal diameter of the pressure cylinder 2, corresponding to the outer diameter of the screws carried by the rotary axis 6, is preferably about two inches, i.e. about 5 cm.

Optionally, the wall of the pressure cylinder 2 may be perforated with a few pin holes over the surface of the pressure cylinder which lies within the jacket 3, each pin hole having a diameter of less than 1.5 mm. In this way, heated water vapor (steam) may be introduced to the material within the pressure cylinder to effect supplementary moistening and/or heating thereof.

As the buffer solution to be introduced through the buffer solution supply pipe, there may be used an aqueous solution of sodium carbonate, sodium polyphosphonate or a mixture thereof with a pH value of 8 to 10, preferably 9.8

In operation of the device according to the present invention for the inactivation of, for example, whole soybeans containing lipoxygenase, the whole soybean raw material having a moisture content of less than 20% and drained of free water, is introduced through the hopper 1 into the pressure cylinder 2 and gradually moved downstream by the action of the conveying screw 7. When the soybeans reach the area of the buffer solution supply pipe 5, they are placed under alkaline atmospheric conditions and begin to be agitated by the fan screw 8. At the same time, they enter that portion of the pressure cylinder surrounded by the jacket 3 and heated by steam through the water vapor supply pipe 4, whereby the temperature of the whole soybeans become elevated to 100°–110° C.

The rate of the moving raw materials in the pressure cylinder 2 is determined in accordance with the speed of revolution of the rotary axis 6, which may vary depending on the kind of raw material to be treated. In the case of whole soybeans it is preferred that the revolutional speed of the rotary axis be fixed so that the whole soybeans take 40–60 seconds from the time they reach the beginning of the agitation zone adjacent the upstream end of the fan screw 8 to the time when they are released from the downstream end of the conveying screw 9. In this way, the whole soybeans raw material is well heat-treated under pressure and under alkaline atmospheric condition without the soybean protein becoming solidified mainly in the agitation zone, whereby the soybean enzymes, particularly lipoxygenase, become inactivated.

Alternatively, vapor may be introduced into the agitation zone through the pin holes provided in the wall of the pressure cylinder 2 lined with the jacket 3 in the case where it is necessary to have greater moisture in the agitation zone.

In operation of the apparatus of the present invention, the raw materials, particularly whole soybean, from which liquid foods are prepared, are heat-treated under pressure conditions and under alkaline atmospheric conditions while their water content is kept at about 20% by weight, whereby enzymes such as lipoxygenase in the raw material are effectively inactivated, such enzymes otherwise causing disagreeable odors, bitterness, astringency, roughness, etc. for liquid foods as produced and which lead to making such liquid foods unstable and easily deteriorated in quality.

What is claimed is:

1. An apparatus for inactivation of enzymes in oil seeds comprising an elongated pressure cylinder having an upstream end and a downstream end, feed hopper means for feeding oil seeds to the interior of said pressure cylinder at the upstream end thereof, said hopper means being mounted on said pressure cylinder; exhaust pipe means for discharging treated oil seeds from the downstream end of the pressure cylinder, said exhaust pipe means being mounted at the down-stream end of said pressure cylinder; a pressure cylinder jacket surrounding said pressure cylinder along at least a part of the length thereof, said jacket being provided with a water vapor supply pipe; said pressure cylinder being perforated with holes over its surface lying within said pressure cylinder jacket, said holes having diameters less than 1.5 mm; a buffering solution supply pipe means for supplying buffering solution to the interior of said pressure cylinder at a location corresponding to about ¼ of the length of said pressure cylinder from the upstream end thereof and without passage through said jacket; a rotary axle located within said pressure cylinder and coaxial therewith, and provided with a first conveying screw, an agitation fan screw and a second conveying screw, said first and second conveying screws being in slidable contact with the internal wall face of said pressure cylinder so that the space formed by said internal wall face of said pressure cylinder and the screw blades of said first and second conveying screws is maintained air tight.

2. An apparatus according to claim 1 wherein said first conveying screw, said agitation fan screw and said second conveying screw are lengthwise proportioned to provide a pitch scale ratio of 1:2:3 on said rotary axle.

3. An apparatus according to claim 1 wherein the length of each of said first and second conveying screws is about ¼ the length of said pressure cylinder, and the length of said agitation fan screw is about ½ the length of said pressure cylinder.

4. An apparatus according to claim 1 wherein said buffering solution supply pipe empties into said pressure cylinder at about the transition between said first conveying screw and said agitation fan screw; and wherein said pressure cylinder jacket begins immediately downstream of said buffering solution supply pipe entrance point into said pressure cylinder.

5. An apparatus for inactivation of enzymes in oil seeds comprising an elongated pressure cylinder having a first zone, a second zone and a third zone;
  means for feeding oil seeds to the first zone of said pressure cylinder;
  means for discharging treated oil seeds from the third zone of the pressure cylinder;
  a pressure cylinder jacket surrounding said pressure cylinder at least along the length of a portion of the second zone thereof, said jacket being provided with a water vapor supply pipe and said pressure cylinder being provided with small openings through at least portions of its wall lying within said pressure cylinder jacket, said holes having diameters less than 1.5 mm;
  means for supplying steam to the interior of said jacket and for heating said oil seeds in said second zone to a temperature of about 100°–110° C.;
  buffer solution supply means for supplying buffering solution to the interior of said pressure cylinder at a location corresponding to approximately the end of the first zone, and for placing oil seeds within said second zone under alkaline atmospheric conditions;
  a rotary axle located within said pressure cylinder and coaxial therewith, means to rotate said rotary axle, and means to vary the speed of rotation of said rotary axle;
  a first conveying screw mounted on said rotary axle in said first zone, an agitation fan screw mounted on said rotary axle within said second zone, and a second conveying screw mounted on said rotary axle within said third zone.

6. An apparatus according to claim 5 wherein said means to vary the speed of rotation of said rotary axle comprises means to control the rotational speed of the rotary axis so that oil seeds are conveyed through said second and third zones in about 40–60 seconds.

* * * * *